(12) United States Patent
Thakare et al.

(10) Patent No.: US 8,959,426 B1
(45) Date of Patent: Feb. 17, 2015

(54) LOADING CUSTOMER-SUPPLIED NETWORK PAGE GENERATION CODE

(75) Inventors: Prashant J. Thakare, Mercer Island, WA (US); Jeremy Boynes, Mercer Island, WA (US); Andrew S. Huntwork, Seattle, WA (US); Shashank Shekhar, Karnataka (IN); Pravi Garg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 13/363,770

(22) Filed: Feb. 1, 2012

(51) Int. Cl.
G06F 17/27 (2006.01)

(52) U.S. Cl.
CPC ..................................... G06F 17/27 (2013.01)
USPC ................. 715/234; 705/50; 705/51; 705/52; 705/53; 705/26.1; 705/26.41

(58) Field of Classification Search
USPC .................. 715/234; 705/50–53, 26.1, 26.41
See application file for complete search history.

(56) References Cited

U.S. PATENT DOCUMENTS

| 6,757,708 | B1 * | 6/2004 | Craig et al. .................. 709/203 |
| 7,254,634 | B1 * | 8/2007 | Davis et al. .................. 709/228 |
| 7,340,714 | B2 * | 3/2008 | Upton ........................... 717/102 |
| 8,438,648 | B2 * | 5/2013 | Bacus et al. ..................... 726/26 |
| 2002/0046240 | A1 * | 4/2002 | Graham et al. ............... 709/203 |
| 2002/0078168 | A1 * | 6/2002 | Christfort et al. ............. 709/217 |
| 2003/0061132 | A1 * | 3/2003 | Yu et al. .......................... 705/30 |
| 2003/0140100 | A1 * | 7/2003 | Pullara ........................... 709/203 |
| 2010/0217891 | A1 * | 8/2010 | Strack et al. .................. 709/246 |
| 2012/0136926 | A1 * | 5/2012 | Dillon ........................... 709/203 |
| 2012/0136927 | A1 * | 5/2012 | Dillon et al. .................. 709/203 |
| 2012/0136928 | A1 * | 5/2012 | Dillon ........................... 709/203 |
| 2012/0137210 | A1 * | 5/2012 | Dillon ........................... 715/234 |

OTHER PUBLICATIONS

Mueller et al.; Removing Performance Bottlenecks Through JSP Precompilation; Jun. 20, 2002; Weblogic; pp. 1-7.*
Jasper 2 JSP Engine How To; Nov. 3, 2005; The Apache Jakarta Project; pp. 1-4.*
Karedla et al.; Caching Strategies to Improve Disk System Performance; Mar. 1994; Computer; pp. 38-46.*
U.S. Appl. No. 13/348,069 entitled "Securing Execution of Customer-Supplied Network Page Generation Code," filed Jan. 11, 2012.
U.S. Appl. No. 13/363,761 entitled "Multipart Encoding in Data Aggregation for Network Page Generation," filed Feb. 1, 2012.
U.S. Appl. No. 13/363,782 entitled "Error Handling in a Network Page Generation Environment," filed Feb. 1, 2012.

(Continued)

Primary Examiner — Andrew Dyer
(74) Attorney, Agent, or Firm — Thomas|Horstemeyer, LLP (57) ABSTRACT

Disclosed are various embodiments for loading page generation code supplied by customers into a memory. A request for a network page is obtained from a client. The network page is associated with a network site hosted by a hosting provider on behalf of a customer. It is determined whether page generation code configured to generate at least a portion of the network page is preloaded into a memory. Such page generation code is customer supplied. The page generation code is loaded into the memory in response to the request and in response to determining that the page generation code is not preloaded into the memory. The page generation code is executed to generate the at least a portion of the network page in response to the request.

20 Claims, 4 Drawing Sheets

(56) References Cited

OTHER PUBLICATIONS

U.S. Appl. No. 13/363,787 entitled "Data Contracts for Network Page Generation Code," filed Feb. 1, 2012.
U.S. Appl. No. 13/363,816 entitled "Network Site Hosting in a Managed Environment," filed Feb. 1, 2012.
U.S. Appl. No. 13/348,051 entitled "Generating Network Pages Using Customer-Supplied Generation Code," filed Jan. 11, 2012.
U.S. Appl. No. 13/348,088 entitled "Facilitating Access to Data in Network Page Generation Code," filed Jan. 11, 2012.
U.S. Appl. No. 13/348,081 entitled "Virtual File System for Hosted Network Sites," filed Jan. 11, 2012.
U.S. Appl. No. 13/348,059 entitled "Generating Network Pages Using Customer-Generated Network Page Portions," filed Jan. 11, 2012.
U.S. Appl. No. 13/347,953 entitled "Opportunistic Unloading of Network Applications," filed Jan. 11, 2012.

* cited by examiner

LOADING CUSTOMER-SUPPLIED NETWORK PAGE GENERATION CODE

BACKGROUND

Network pages are becoming increasingly complex. While in the past network pages may have been static files, network pages now are typically dynamically generated by complex applications using data obtained from many different sources. As a non-limiting example, a network page for an online retailer may include information obtained from a product catalog application, a user information application, a shopping cart application, and/or other sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to loading customer-supplied network page generation code. A hosting provider may offer network site hosting for a plurality of customers. Such hosting may include access to an electronic commerce platform or other hosted application. For security and other various reasons, customer-supplied network page generation code may be executed under a framework that restricts the operations permitted in the code. Also, the page generation code may be restricted from directly accessing data sources of the electronic commerce platform. To provide access, data from the electronic commerce platform that is used by the page generation code may be aggregated from one or more data sources in advance for use by the page generation code.

Various techniques relating to a data aggregation framework are provided in U.S. patent application Ser. No. 13/348,051 entitled "GENERATING NETWORK PAGES USING CUSTOMER-SUPPLIED GENERATION CODE" and filed on Jan. 11, 2012, and in U.S. patent application Ser. No. 13/348,059 entitled "GENERATING NETWORK PAGES USING CUSTOMER-GENERATED NETWORK PAGE PORTIONS" and filed on Jan. 11, 2012, both of which are incorporated herein by reference in their entirety.

Various embodiments of the present disclosure provide an efficient approach to loading customer-supplied page generation code into memory. Instead of loading the page generation code into memory in response to the code being initially submitted or uploaded by the customer, and instead of loading the page generation code after each network page request, the page generation code is loaded into memory in response to a first network page request. Although an end user may see diminished performance in response to the first network page request relative to subsequent requests, the first request may be a relatively rare event, making the diminished first request performance an acceptable tradeoff. In one embodiment, where the page generation code is part of a customer-supplied web application, the entire customer-supplied web application may be loaded into memory responsive to the first network page request. In the following discussion, a general description of the system and its components is provided, followed by a discussion of the operation of the same.

Figure 1:
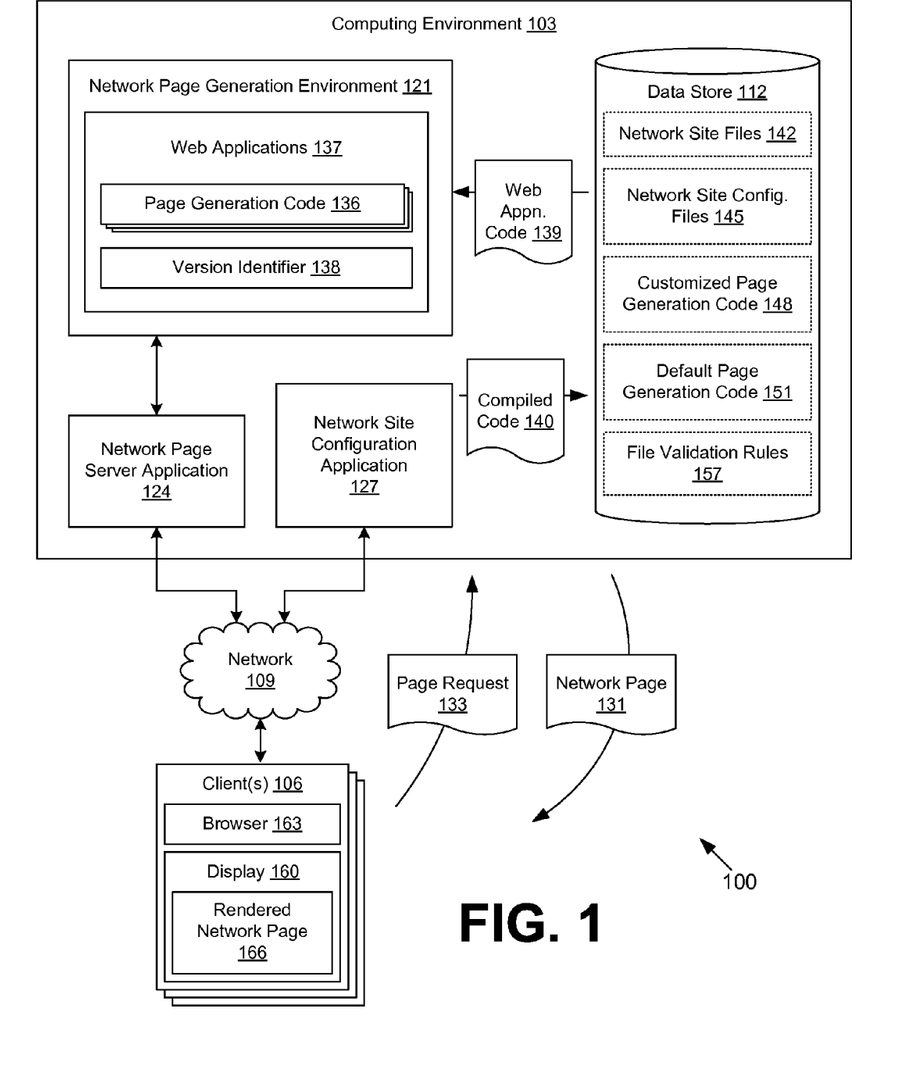
FIG. 1 is a drawing of a networked environment according to various embodiments of the present disclosure.

With reference to FIG. 1, shown is a networked environment 100 according to various embodiments relating to customer-supplied page generation code. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below. The data stores 112 may include mounted drives, network file systems, cloud storage systems, and so on, which correspond to file systems associated or linked with customer network sites. Where a cloud storage system is employed, it is understood that a file system may correspond to a storage "bucket" that is used to store and obtain data from the cloud storage system.

The components executed by the computing environment 103, for example, include a network page generation environment 121, a network page server application 124, a network site configuration application 127, and other applications, services, processes, systems, engines, or functionality not discussed in detail herein. The network page generation environment 121 is executed to generate the network pages 131 in response to page requests 133 obtained from clients 106. The network pages 131 may correspond to web pages, gopher pages, mobile application screens, and/or other forms of network content. Where the customer is a merchant, the network pages 131 may correspond to home pages, catalog pages, item detail pages, shopping cart pages, checkout pages, order confirmation pages, and so on. Such network pages 131 may facilitate selecting items for purchase, rental, download, lease, or other form of consumption. In addition, where the customer is a merchant, the network page generation environment 121 may include, or be in communication with, an electronic commerce system that performs various backend functions in order to facilitate the online purchase of items.

The network page generation environment 121 may execute page generation code 136 from web applications 137 in order to generate the network pages 131. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into JAVA® servlets, which in turn may be compiled into bytecode which may be executable by the network page generation environment 121.

The page generation code 136 may be packaged into web applications 137. A web application 137 may include multiple different page generation codes 136 for generating different network pages 131 or different portions of network pages 131. In one embodiment, a web application 137 corresponds to a web application archive (WAR) file. The web application 137 may include a version identifier 138 identifying the specific version of the web application 137. In some embodiments, each page generation code 136 may have a respective version identifier 138. In one embodiment, the web application 137 loaded by the network page generation environment 121 includes compiled versions of the page generation code 136, e.g., compiled servlets, class files, etc.

The network page generation environment 121 may include a JAVA® Virtual Machine (JVM) and a servlet container or web application container such as APACHE® TOMCAT® or another servlet container. The network page generation environment 121 may be configured to obtain and provide aggregated data to the page generation code 136, for example, as a set of predefined implicit variables or by another approach. The network page generation environment 121 may act as a "sandbox" for the page generation code 136 to enforce restrictions on application programming interface (API) calls, access to data sources, and/or other resources in the computing environment 103. As a non-limiting example, where the network page generation environment 121 includes a JVM, a security manager may be installed in the JVM to deny access by the page generation code 136 to system data, data of other customers, and so on. As will be described, the network page generation environment 121 is configured to load a web application 137 into memory from web application code 139 stored by the data store 112 responsive to receiving the first page request 133 for a network page 131 that is generated at least in part by the web application 137.

The network page server application 124 is configured to obtain the page requests 133 from the client 106 over the network 109, to generate network pages 131 in response to the page requests 133 using the network page generation environment 121, and to return the network pages 131 to the client 106 by way of the network 109. The network page server application 124 may also serve up other files and resources in response to requests over the network 109. The network page server application 124 may correspond to a commercially available hypertext transfer protocol (HTTP) server such as, for example, APACHE® HTTP Server, APACHE® TOMCAT®, MICROSOFT® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers. The network site configuration application 127 may include various components and/or may invoke various components of the network page generation environment 121 to enforce compile-time restrictions on the page generation code 136. The network site configuration application 127 may be configured to compile the page generation code 136 and/or to package the page generation code 136 into web applications 137. The network site configuration application 127 stores the compiled code 140 in the data store 112.

The data stored in the data store 112 includes, for example, network site files 142, network site configuration files 145, customized page generation code 148, default page generation code 151, file validation rules 157, and potentially other data. The network site files 142 correspond to files and other data used in the generation of the network pages 131 for the hosted network sites of the merchants or other customers. The network site files 142 may also correspond to other network resources besides network pages 131. Such files may include, for example, templates, hypertext markup language (HTML), text, extensible markup language (XML), cascading style sheets (CSS), images, audio, video, animations, and/or other data.

The network site configuration files 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 and/or web applications 137 which are created or customized by merchants or other customers. The default page generation code 151 may correspond to a default set of page generation code 136 or web application 137 for a merchant or other customer to use for a base functionality for a network site. The default page generation code 151 may generate network pages 131 having, for example, a default appearance and behavior for a generic electronic commerce site.

The file validation rules 157 may configure various restrictions to be placed on the page generation code 136 by the network page generation environment 121. As a non-limiting example, where the page generation code 136 corresponds to JSP code, the network page generation environment 121 may restrict the JSP code from including scriptlets and/or various API calls. Various functionalities may be whitelisted or blacklisted, as the case may be. The file validation rules 157 may also be used to validate network site configuration files 145. The file validation rules 157 may also configure restrictions on writing to certain files or portions of files.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 131 served up by the computing environment 103 and/or other servers, thereby generating a rendered network page 166 on the display 160. The client 106, when controlled by a hosting customer, may include applications that interact with the network site configuration application 127 to facilitate control of the network site. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 131 accessible through the network site. Alternatively, or additionally, the merchant or other customer may create customized page generation code 148 for generating some or all of the network pages 131 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 131 for their network sites, despite using a hosted infrastructure and potentially a hosted electronic commerce platform.

When a customer uploads or edits page generation code 136, the network site configuration application 127 and/or other applications may perform various verifications on the static code. Such verifications may be referred to as compile-time checks, but need not occur at the same time the page generation code 136 is compiled, and in some cases, the page generation code 136 may be interpreted rather than compiled. Such verifications may be performed as configured by the file validation rules 157. If applicable, the resulting compiled code 140 is stored in the data store 112 and may correspond to the customized page generation code 148 and/or the default page generation code 151. Version identifiers 138 associated with the page generation code 136 may be updated when the page generation code 136 is modified.

With respect to operation of the network site, the client 106 sends a page request 133 to the network page server application 124 for some network page 131 from the network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation environment 121.

The network page generation environment 121 determines whether the page generation code 136 and/or the web application 137 containing the page generation code 136 has been loaded. It may be desirable not to load the web applications 137 into the network page generation environment 121 until the first page request 133 associated with the corresponding page generation code 136 is received. This delayed loading may result in increased latency for servicing the first page request 133, but the delayed loading may be an acceptable tradeoff. Similarly, an updated version of the page generation code 136 and/or web application 137 may be loaded responsive to the first page request 133 obtained after the updated version has become available. Although the loading herein may refer to loading into a memory accessible to the network page generation environment 121, the loading may also encompass any form of runtime configuration of the components of the network page generation environment 121 that may be necessary in order to execute the page generation code 136 and service the page request 133.

In some embodiments, the entirety of the web application 137 may be loaded by the network page generation environment 121 responsive to a page request 133 that invokes only a portion of the page generation code 136 in the web application 137. In other words, other page generation code 136 that is used to generate at least a portion of other network pages 131 may be loaded concurrently with the page generation code 136 that is used to service the initial page request 133. The page generation code 136 and/or the web application 137 may persist in the memory indefinitely. In some cases, the page generation code 136 and/or the web application 137 may be purged after a predefined time period or according to a least-recently-used approach or another approach.

The page generation code 136 for the requested network page 131 is executed by the network page generation environment 121. The network page generation environment 121 facilitates access to various data by the page generation code 136. The page generation code 136 generates the network page 131, and the network page server application 124 serves up the network page 131 to the client 106 in response to the page request 133. It is noted that subsequent page requests 133 for the same network page 131 or other network pages 131 of the hosted network site may see increased performance because the page generation code 136 and/or the entire web application 137 has already been loaded by the network page generation environment 121.

Figure 2:
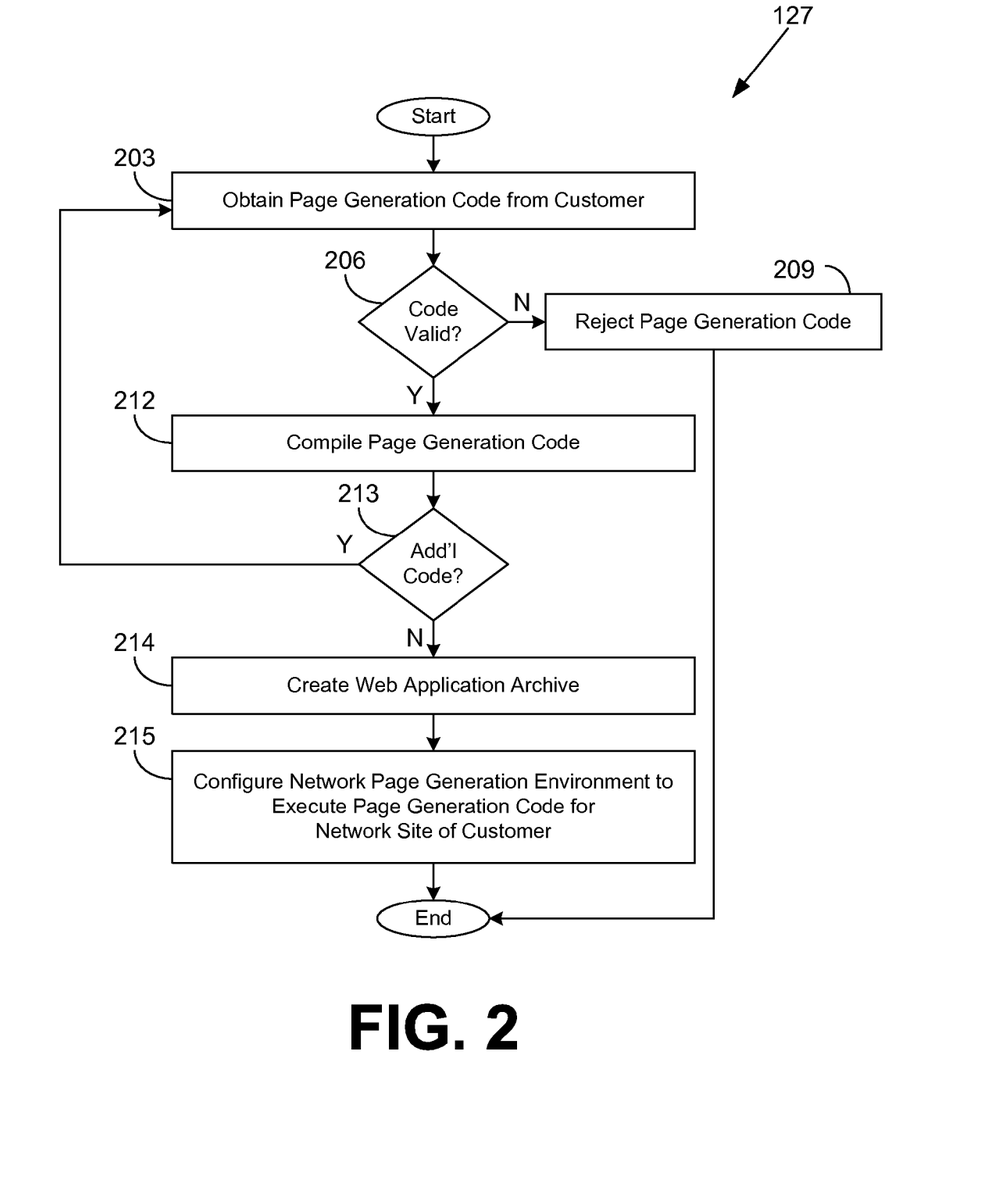
FIG. 2 is a flowchart illustrating one example of functionality implemented as portions of a network site configuration application executed in a computing environment in the networked environment of FIG. 1 according to various embodiments of the present disclosure.

Referring next to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) from a customer whose network site is hosted by the hosting provider who operates the computing environment 103. The network site configuration application 127 may be configured to authenticate a client 106 (FIG. 1) associated with the customer. In box 206, the network site configuration application 127 determines whether the page generation code 136 is valid. If the page generation code 136 is not valid, the network site configuration application 127 rejects the page generation code 136 in box 209. An error may be presented to the customer. Thereafter, the portion of the network site configuration application 127 ends.

If the page generation code 136 is valid, the network site configuration application 127 proceeds from box 206 to box 212. Even assuming that the page generation code 136 is determined to be valid by the network site configuration application 127, validity checks may still need to be performed by the network page generation environment 121 (FIG. 1) at runtime. In box 212, the network site configuration application 127 compiles the page generation code 136. For example, the network site configuration application 127 may compile the page generation code 136 from a JSP into a servlet. The resulting servlet code may also be compiled into bytecode for execution by a JAVA® Virtual Machine (JVM) or directly by a processor circuit of the computing environment 103.

In box 213, the network site configuration application 127 determines whether additional page generation code 136 is to be obtained from the customer. If additional page generation code 136 is to be obtained, the network site configuration application 127 returns to box 203. If additional page generation code 136 is not to be obtained, the network site configuration application 127 proceeds to box 214. In box 214, the network site configuration application 127 creates an archive file for a web application 137 (FIG. 1) containing the page generation code 136. In other embodiments, the customer may upload the web application 137 directly, or the page generation code 136 might not be packaged into a particular file or grouping.

In box 215, the network site configuration application 127 configures the network page generation environment 121 to execute the compiled page generation code 136 from the web application 137 for one or more network pages 131 (FIG. 1) for the network site of the customer. Thereafter, the portion of the network site configuration application 127 ends.

Figure 3:
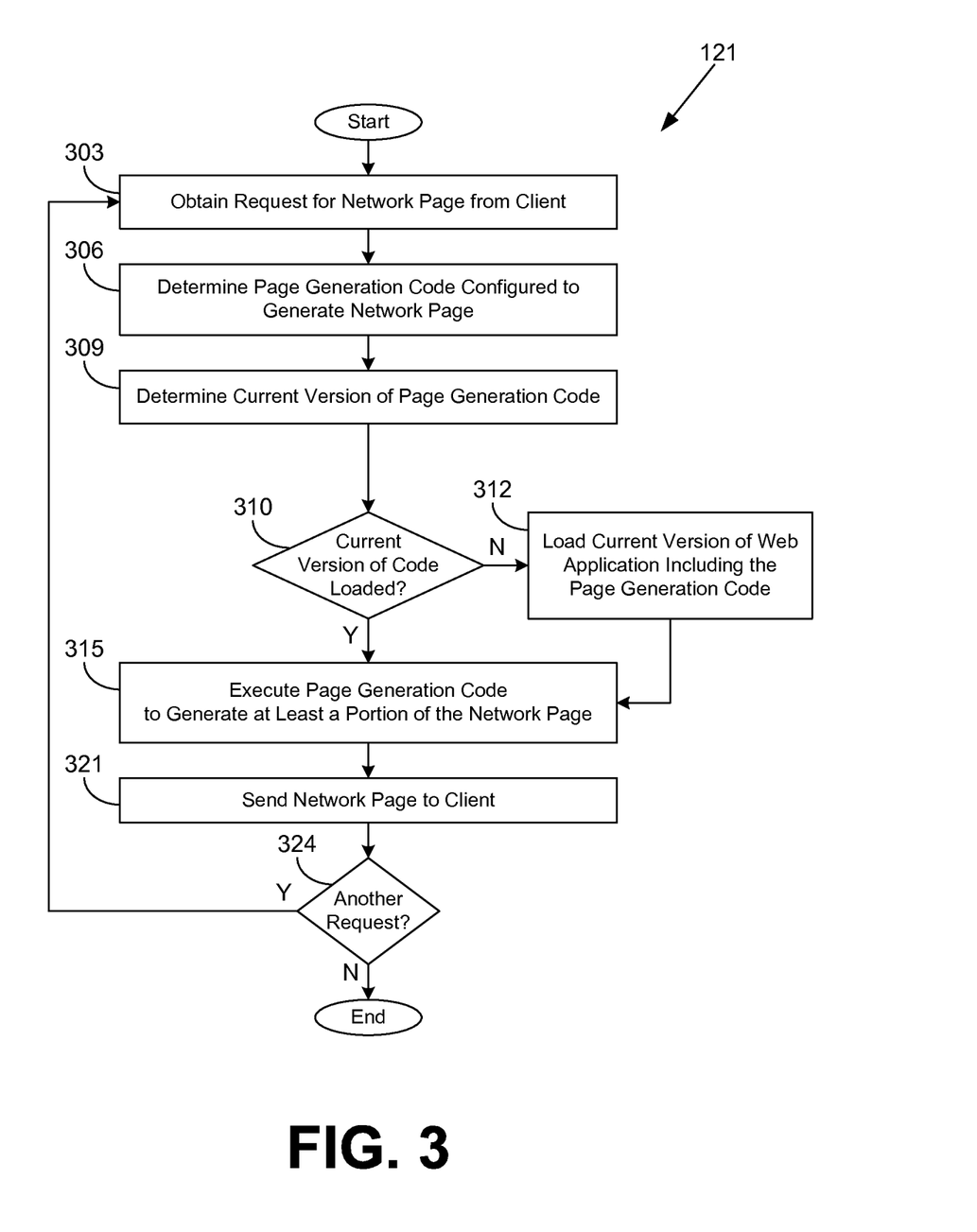
FIG. 3 is a flowchart illustrating one example of functionality implemented as portions of a network page generation environment executed in a computing environment in the networked environment of FIG. 1 according to various embodiments of the present disclosure.

Turning now to FIG. 3, shown is a flowchart that provides one example of the operation of a portion of the network page generation environment 121 according to various embodiments. It is understood that the flowchart of FIG. 3 provides merely an example of the many different types of functional arrangements that may be employed to implement the operation of the portion of the network page generation environment 121 as described herein. As an alternative, the flowchart of FIG. 3 may be viewed as depicting an example of steps of a method implemented in the computing environment 103 (FIG. 1) according to one or more embodiments.

Beginning with box 303, the network page generation environment 121 obtains a first page request 133 (FIG. 1) for a network page 131 (FIG. 1) from a client 106 (FIG. 1). In box 306, the network page generation environment 121 determines the page generation code 136 (FIG. 1) or web application 137 (FIG. 1) which is configured to generate at least a portion of the requested network page 131. In box 309, the network page generation environment 121 determines the current version of the page generation code 136. In box 310, the network page generation environment 121 determines whether the current version of the page generation code 136 has been loaded into memory. It may be that no version of the page generation code 136 has been loaded into memory, or it may be that a previous version of the page generation code 136 has been loaded into memory.

If the current version of the page generation code 136 has not been loaded into memory, the network page generation environment 121 moves from box 310 to box 312 and loads the current version of the web application 137, including the page generation code 136, from the data store 112 (FIG. 1). Meanwhile, the network page generation environment 121 may, in some embodiments, opportunistically fetch data to be provided to the page generation code 136. The network page generation environment 121 then continues to box 315. If, instead, the page generation code 136 does correspond to the current version, the network page generation environment 121 proceeds directly from box 310 to box 315.

In box 315, the network page generation environment 121 executes the page generation code 136 to generate at least a portion of the network page 131. In box 321, the network page generation environment 121 sends the network page 131 to the client 106 in response to the page request 133. In box 324, the network page generation environment 121 determines whether another page request 133 is received. If another page request 133 is received, the network page generation environment 121 returns to box 303 and obtains the next page request 133. If another page request 133 is not received, the portion of the network page generation environment 121 ends.

Figure 4:
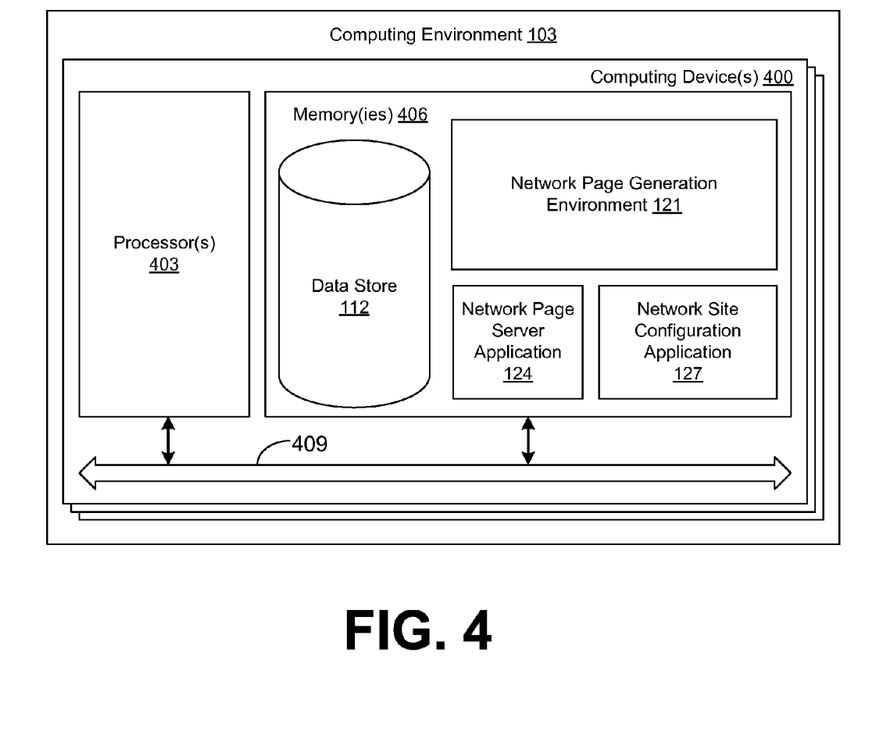
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 comprises one or more computing devices 400. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page generation environment 121, the network page server application 124, the network site configuration application 127, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, JAVA®, JAVAS-CRIPT®, Perl, PHP, VISUAL BASIC®, PYTHON®, Ruby, DELPHI®, FLASH®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page generation environment 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the network site configuration application 127 and the network page generation environment 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation environment 121, the network page server application 124, and the network site configuration application 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, the at least one application comprising:
   logic that, in response to receiving a first request for a network page from a client, determines whether a servlet comprising page generation code configured to generate at least a portion of the network page is preloaded into a memory prior to the first request, the network page being associated with a network site hosted by a hosting provider on behalf of a customer, the page generation code being supplied by the customer;

logic that loads the servlet into the memory in response to determining that the servlet is not preloaded into the memory prior to the first request;

logic that executes the page generation code to generate the at least a portion of the network page in response to the first request;

logic that sends the network page to the client; and wherein the servlet remains in the memory after being executed so as to be available for execution in response to at least one subsequent request.

2. The system of claim 1, wherein the at least one application further comprises:

logic that determines whether the servlet loaded into the memory is a current version; and wherein the servlet is determined not to be preloaded into the memory in response to determining that the servlet loaded into the memory is not the current version.

3. The system of claim 1, wherein the logic that loads the servlet into the memory is further configured to obtain the servlet from a data store.

4. The system of claim 1, wherein the logic that loads the servlet into the memory is configured to load the servlet into a servlet container.

5. The system of claim 1, wherein the servlet that is loaded into the memory in response to the first request is configured to generate at least a portion of at least one of a plurality of other network pages associated with the network site.

6. The system of claim 5, wherein the servlet that is loaded into the memory is loaded from a web application archive (WAR) file.

7. The system of claim 1, wherein the at least one application further comprises:

logic that obtains a source version of the servlet from the customer;

logic that generates a compiled version of the servlet from the source version of the servlet; and wherein the compiled version of the servlet corresponds to the servlet that is loaded into the memory.

8. The system of claim 7, wherein the source version of the servlet corresponds to scripting code, and the compiled version of the servlet corresponds to compiled servlet code.

9. A method, comprising:

receiving, via at least one of one or more computing devices, a first request for a network page from a client, the network page being associated with a network site hosted by a hosting provider on behalf of a customer;

determining, via at least one of the one or more computing devices, whether a current version of a servlet configured to generate at least a portion of the network page is preloaded into a memory prior to the first request, the servlet being supplied by the customer;

loading, via at least one of the one or more computing devices, the current version of the servlet into the memory at least partly in response to both receiving the first request and determining that the current version of the servlet is not preloaded into the memory prior to the first request;

executing, via at least one of the one or more computing devices, page generation code from the servlet to generate the at least a portion of the network page at least partly in response to receiving the first request;

sending, via at least one of the one or more computing devices, the network page to the client; and wherein the current version of the servlet remains loaded into the memory for use in responding to a plurality of subsequent requests for a plurality of other network pages.

10. The method of claim 9, wherein loading further comprises loading, via at least one of the one or more computing devices, a plurality of compiled servlets into a servlet container.

11. The method of claim 9, wherein loading further comprises receiving, via at least one of the one or more computing devices, the servlet from a data store.

12. The method of claim 9, wherein the servlet includes another page generation code configured to generate at least a portion of a plurality of other network pages.

13. The method of claim 9, wherein the servlet is included in a web application archive (WAR) file.

14. The method of claim 9, wherein the page generation code corresponds to scripting code.

15. The method of claim 9, wherein the servlet that is loaded into the memory in response to the first request is configured to generate at least a portion of at least one of a plurality of other network pages associated with the network site.

16. The method of claim 9, further comprising:

receiving, via at least one of the one or more computing devices, a source version of the page generation code from the customer;

generating, via at least one of the one or more computing devices, a compiled version of the page generation code from the source version of the page generation code; and wherein the compiled version of the page generation code is included in the servlet that is loaded into the memory.

17. The method of claim 16, wherein the source version of the page generation code corresponds to scripting code.

18. A non-transitory computer-readable medium embodying at least one program executable in at least one computing device, the at least one program comprising:

code that, in response to obtaining a source version of a web application from a customer of a hosting provider, generates a compiled version of the web application from the source version of the web application, the web application comprising a web servlet and including page generation code configured to generate a plurality of network pages associated with a network site hosted by the hosting provider on behalf of the customer;

code that, in response to obtaining a first request for at least one of the plurality of network pages from a client, determines whether a current compiled version of the web servlet has been preloaded into a web application container prior to obtaining the first request;

code that, in response to determining that the current compiled version of the web servlet has not been preloaded into the web application container prior to the first request, loads the current compiled version of the web servlet into the web application container;

code that executes at least a portion of the page generation code from the web application to generate the at least one of the plurality of network pages in response to the first request;

code that causes the at least one of the plurality of network pages to be sent to the client; and wherein the current compiled version of the web servlet remains loaded into the web application container for use in responding to a plurality of subsequent requests for a plurality of network pages of the network site.

19. The non-transitory computer-readable medium of claim 18, wherein the web application container corresponds to a servlet container.

20. The non-transitory computer-readable medium of claim 18, wherein the program further comprises:
- code that determines whether a previous compiled version of the web servlet is the current compiled version of the web servlet; and
- code that purges the previous compiled version of the web servlet from the web application container in response to both obtaining the first request and determining that the previous compiled version of the web servlet is not the current compiled version of the web servlet.

* * * * *